US007512884B2

(12) United States Patent
Gupta et al.

(10) Patent No.: US 7,512,884 B2
(45) Date of Patent: Mar. 31, 2009

(54) SYSTEM AND METHOD FOR SWITCHING OF MEDIA PRESENTATION

(75) Inventors: Madhuvan Gupta, Bellevue, WA (US); Myron Clifford Thomas, Newcastle, WA (US); Richard William Saunders, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 10/607,256

(22) Filed: Jun. 25, 2003

(65) Prior Publication Data

US 2004/0268262 A1 Dec. 30, 2004

(51) Int. Cl.
*G06F 3/00* (2006.01)
*G06F 3/048* (2006.01)

(52) U.S. Cl. .................................. 715/718; 715/716
(58) Field of Classification Search ................ 715/719, 715/718, 716, 800
See application file for complete search history.

(56) References Cited

U.S. PATENT DOCUMENTS

| | | | |
|---|---|---|---|
| 6,028,604 A | 2/2000 | Matthews, III et al. | |
| 6,067,559 A | 5/2000 | Allard et al. | |
| 6,072,486 A | 6/2000 | Sheldon et al. | |
| 6,097,380 A * | 8/2000 | Crites et al. | 715/500.1 |
| 6,141,003 A * | 10/2000 | Chor et al. | 715/719 |
| 6,177,931 B1 * | 1/2001 | Alexander et al. | 725/52 |
| 6,202,212 B1 * | 3/2001 | Sturgeon et al. | 725/141 |
| 6,219,042 B1 * | 4/2001 | Anderson et al. | 715/716 |
| 6,266,059 B1 * | 7/2001 | Matthews et al. | 715/810 |
| 6,313,851 B1 | 11/2001 | Matthews, III et al. | |
| 6,344,865 B1 | 2/2002 | Matthews, III et al. | |
| 6,357,042 B2 | 3/2002 | Srinivasan et al. | |
| 6,384,849 B1 | 5/2002 | Morcos et al. | |
| 6,469,721 B2 | 10/2002 | Matthews, III et al. | |
| 6,507,875 B1 | 1/2003 | Mellen-Garnett et al. | |
| 6,859,937 B1 * | 2/2005 | Narayan et al. | 725/37 |
| 6,954,897 B1 * | 10/2005 | Noguchi et al. | 715/542 |
| 6,980,979 B2 * | 12/2005 | Huang et al. | 707/2 |
| 2003/0044171 A1 * | 3/2003 | Otsuka et al. | 386/126 |

OTHER PUBLICATIONS

Microsoft Press, Microsoft Computer Dictionary, Fifthe Edition, p. 423.*
"A MPEG-4 Media Presenter on Real-Time OS", Shin et al., PDPTA '00 International Conference, pp. 2310-2317.
"Distributed parallel volume rendering on shared memory systems", Hancock et al., Future Generation Computer Systems 13 (1997/98), pp. 251-259, 1998 Elsevier Science B.V.
"RIVA: A Versatile Parallel Rendering System for Interactive Scientific Visualization", Li et al., IEEE Transactions on Visualization and Computer Graphics, vol. 2, No. 3, Sep. 1996, pp. 186-201.
Mystik Media, http://web.archive.org/web/20020122214802/http://www.trayaudio.com/, Jan. 2002,(2001-2002).

(Continued)

*Primary Examiner*—Dennis Bonshock

(57) ABSTRACT

A system and method for switching presentation of media between two or more processes without interruption is described. This system and method can enable a user to enjoy media presented in a process and then switch the presentation of that media to another process without interruption in the media. Further, this system and method can enable a user to switch back and forth between media presentation within one application and another application without interruption.

39 Claims, 10 Drawing Sheets

OTHER PUBLICATIONS

Gustosoft.com, http://web.archive.org/web/20021130001235/http://gustosoft.com/, Nov. 2002.

"Window Explorer", http://en.wikipedia.org/wiki/Windows_Explorer (1 of 14) Apr. 25, 2008, 1-14.

* cited by examiner

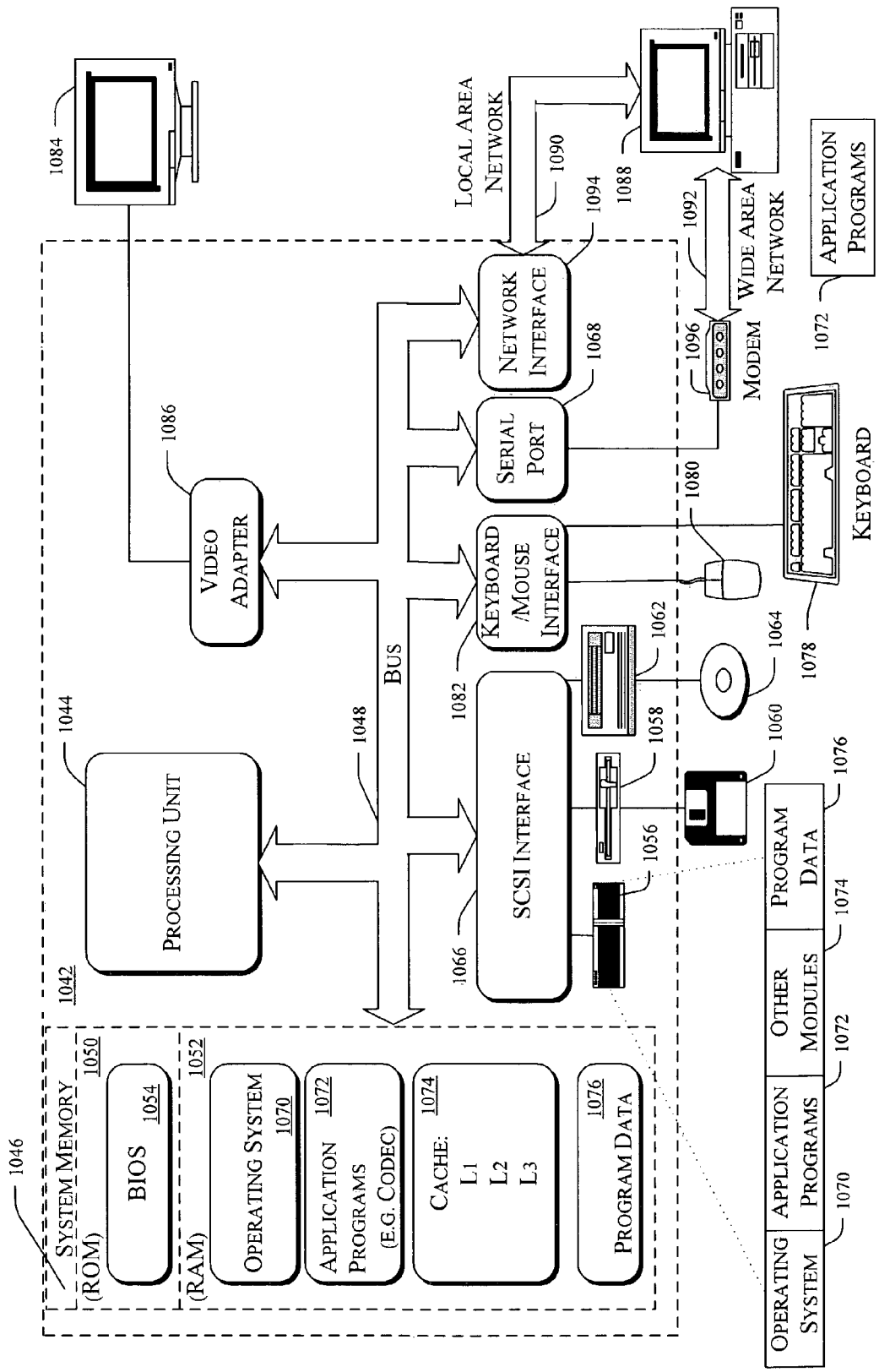

SYSTEM AND METHOD FOR SWITCHING OF MEDIA PRESENTATION

TECHNICAL FIELD

This invention relates to switching a media presentation between user interfaces.

BACKGROUND

Some applications, like Web browsers, allow computer users to engage in various tasks while also viewing a media file. MSN 8 Internet Software® ("MSN8"), for instance, allows a user to browse Web pages on the Internet and at the same time view a media file, such as a video clip showing the latest sports highlight, a music video, a graphic visualization, or the like. The browsed Web pages and the media are shown within a window, typically with the Web pages occupying a large visual space and the media shown in a small visual space within the window. FIG. 1 shows an example of a user interface 102 containing a web page 104 and a rendered video 106.

Typically, a lightweight presentation component provides the user with basic controls and services, like play, stop, pause, volume control, and the like. A component user interface 108 shows an example of some of these basic controls.

The user, however, may wish to see the media in a larger window with more advanced services. Currently, the user can switch the media from being presented within the component user interface 108 (which is part of the user interface 102) to another user interface generated by another application, which provides advanced services. Once the user selects to switch the media presentation to the full-featured presentation application, the media can be presented in that application's window.

FIG. 2 shows an example of an advanced user interface 202 created by the full-featured presentation application. This advanced user interface 202 includes elements allowing greater control and providing advanced services for the user. The advanced user interface 202 is shown here presenting a later part of the video presented in FIG. 1 by the lightweight presentation component of FIG. 1.

Thus, the user switched from the basic services shown in FIG. 1 to the advanced services in FIG. 2.

One problem with this switching, however, is that the video is temporarily interrupted. This interruption delays the presentation of the media file, such that its presentation only resumes in the second application after a noticeable period of time. This interruption can also include a loss in part of the file being presented. An interruption in the presentation of a media file can be distracting to the user and interferes with the user's viewing of the media.

SUMMARY

The following description and figures describe a system and method for seamlessly switching rendered media between two user interfaces. This system and method enables a user to switch presentation of a media file from within one user interface to within another user interface without interrupting the presentation.

The system includes a rendering component running within one process that is capable of rendering media for presentation in a visual space of another process.

BRIEF DESCRIPTION OF THE DRAWINGS

FIG. 10 is a block diagram of a computer system that is capable of implementing a method for switching presentation of media from one process to another.

The same numbers are used throughout the disclosure and figures to reference like components and features.

DETAILED DESCRIPTION

Currently, applications that present media typically also render that media. Presentation of media includes where and how it is presented, such in which visual space in a window, the colors used, the size of the visual space, and the like. Rendering of media, however, involves transformation from bits in a file to pixels on a computer screen. Currently, when a user wishes to switch the presentation of media from a first application to a second application the presentation is interrupted. This is because the first application stops rendering the media file and the second application starts rendering the media file, causing an interruption in the presentation because this switching of rendering is not seamless.

The following disclosure describes a way to switch presentation of media between a user interface within one process and a user interface within another process without interruption. Presentation of media can be switched from one application or process to another by using a renderer that renders media for both the one application or process and the other application or process. (In cases where each application used for presentation of media is in a separate process, the terms "process" and "application" are usable interchangeably). Because of this, when a user desires to switch the presentation of the media file from one application to another, the presentation of the media file is not interrupted. The renderer keeps rendering the media file even if where and how the media is presented is changed, thereby allowing the switched-to application to present the media file without interruption.

Figure 1:
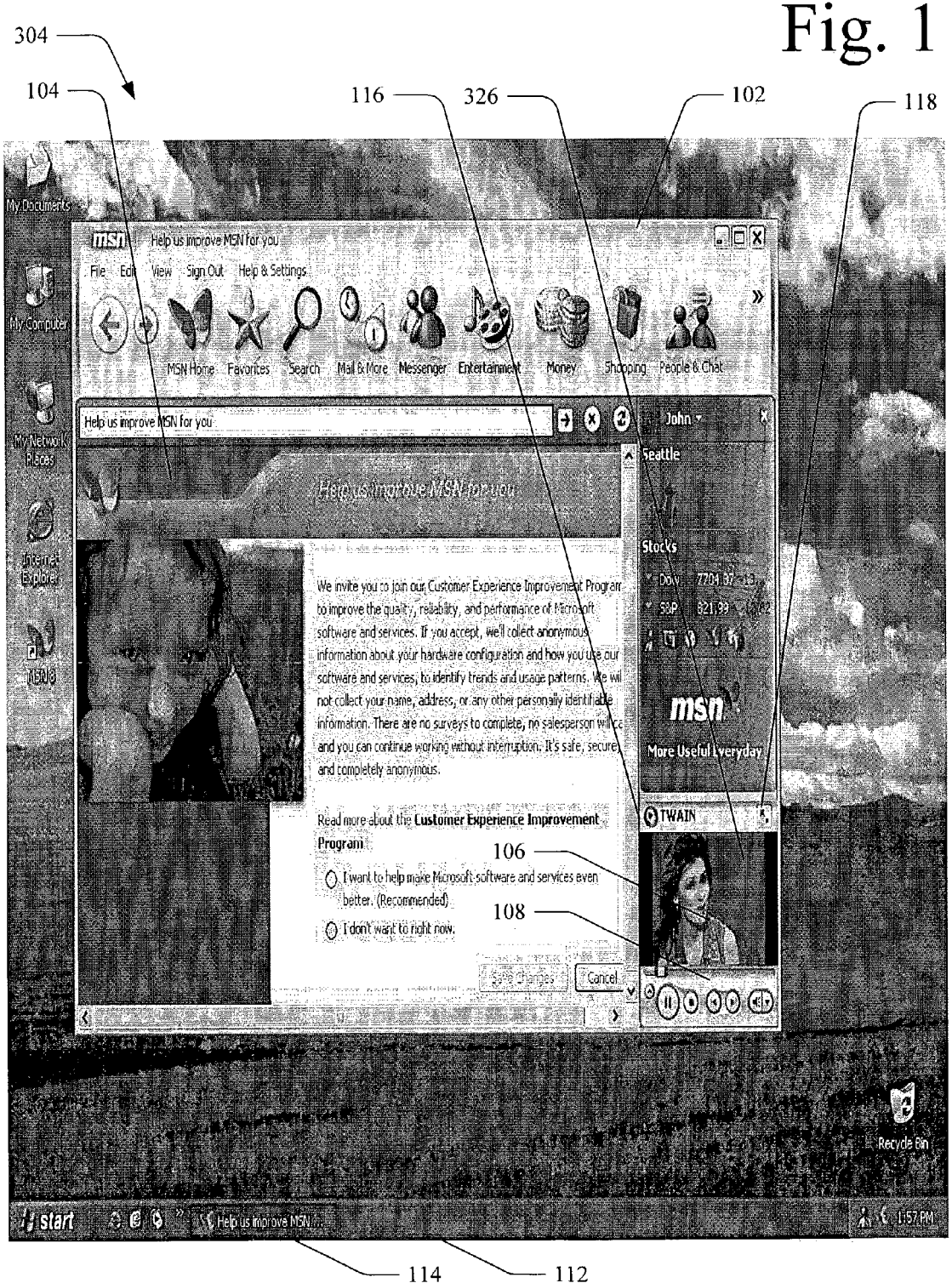
FIG. 1 illustrates exemplary user interfaces of a first application and a lightweight presentation component, with the lightweight presentation component presenting media in the lightweight presentation component's visual space.
Figure 2:
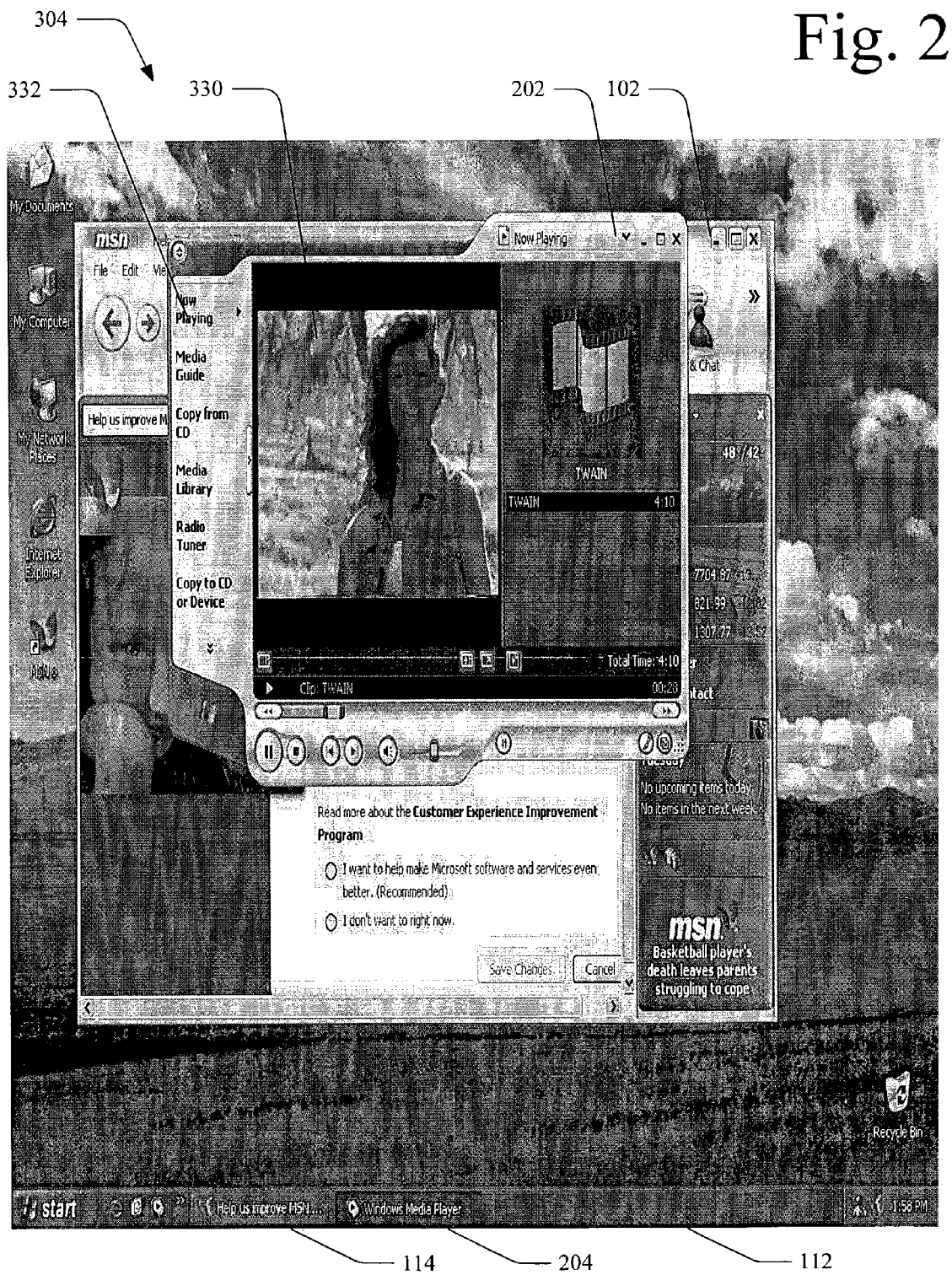
FIG. 2 illustrates an exemplary user interface of a full-featured presentation application, including presentation of media in the full-featured presentation application's visual space.

The example given in the background discusses one situation in which a user might wish to switch the presentation of a media file from a first application to a second application. The user may wish to do so because she wishes to take advantage of advanced services offered by the second application. The user, however, can switch the presentation of the media file to many different applications and their processes and for various reasons. The example given in FIGS. 1 and 2 are just examples, and are not intended to limit the scope of the invention.

Thus, through use of cross-process rendering, a user can switch between multiple processes, some of which contain applications providing basic services with a lightweight presentation component and some of which contain applications providing advanced services with a full-featured presentation application, without interruption in the presentation of that media.

Exemplary System

Figure 3:
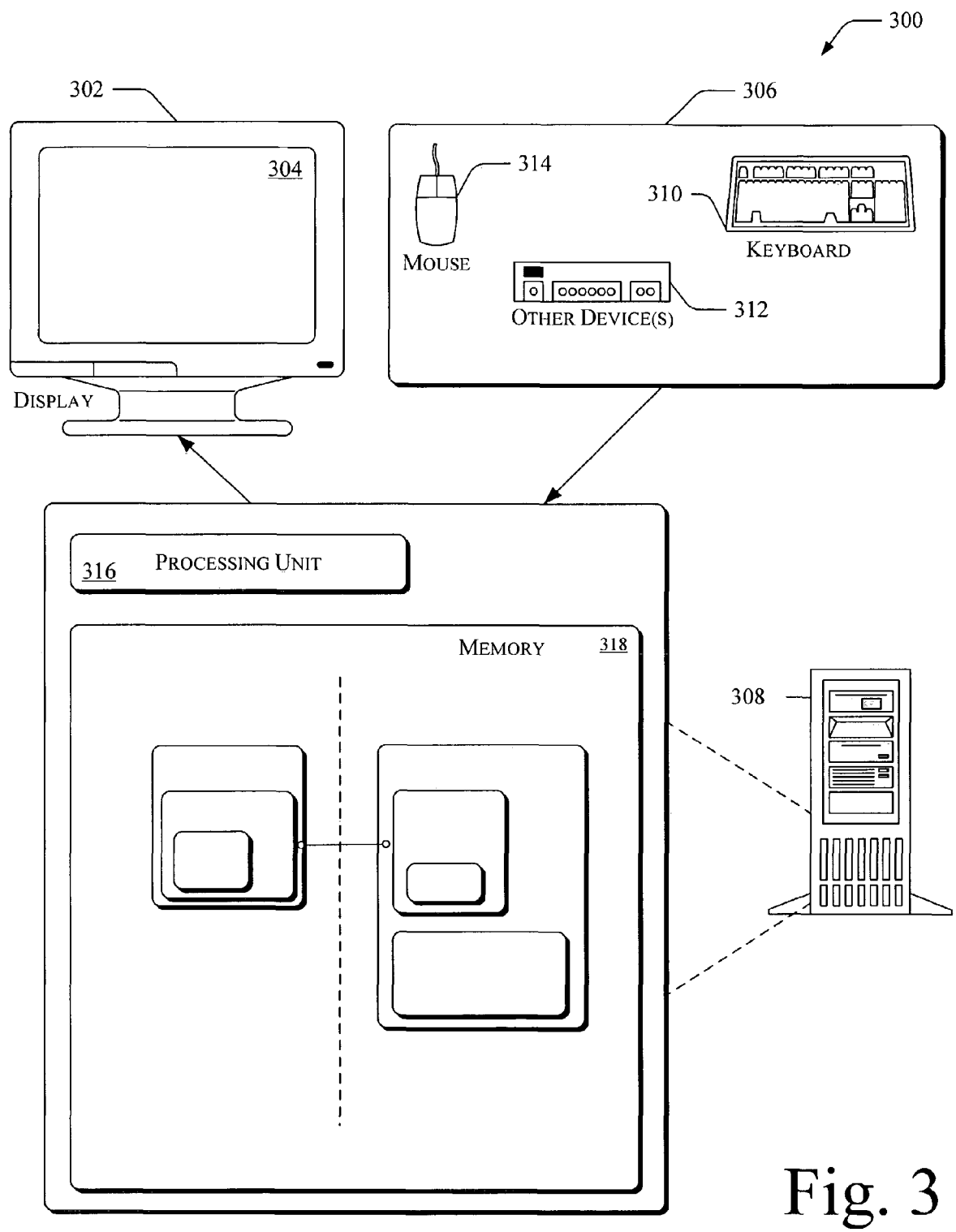
FIG. 3 illustrates a computer system capable of implementing a method for switching presentation of media from one process to another.
Figure 6:
FIG. 6 illustrates an exemplary user interface of a lightweight presentation presenting media in its visual space.

FIG. 3 shows an exemplary system 300 used to facilitate cross-process rendering. The system 300 includes a display 302 having a screen 304, a user-input device 306, and a computer 308. The user-input device 306 can include any device allowing a computer to receive input from a user, such as a keyboard 310, other devices 312, or a mouse 314. The other devices 312 can include a touch screen, a voice-activated input device, a track ball, and the like. The user can send input via the user-input device 306 to the computer 308 selecting to switch presentation from within one process to another. The user can use the display 302 and its screen 304 to view user interfaces containing rendered media. FIGS. 1, 2, and 6 show examples of the screen 304.

The computer 308 includes a processing unit 316 to execute applications and memory 318 containing various applications and the processes that contain them. The memory 318 includes volatile and non-volatile memory and the applications described in FIG. 4.

Figure 4:
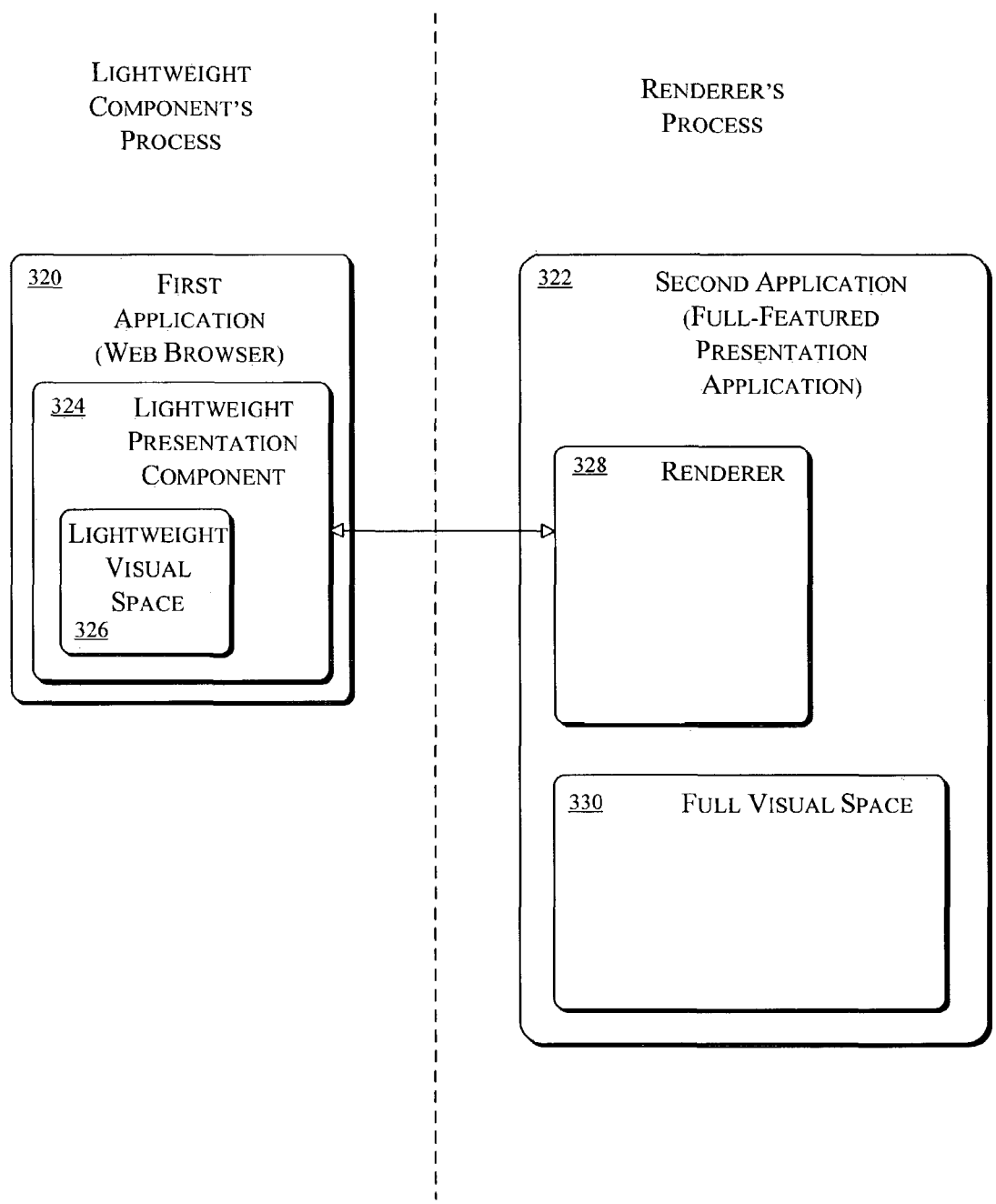
FIG. 4 illustrates an architecture showing a lightweight component's process and a renderer's process and applications running within them, which are within the memory of the computer system of FIG. 3.

FIG. 4 shows applications included within the memory 318 of FIG. 3, communication between these programs (shown as a solid line), and a process boundary (shown as a dashed line). The memory 318 includes an operating system (not shown), a first application 320, and a second application 322. The first application 320 can be one of many different types. One exemplary type of the first application 320 is a Web browser, which for the purpose of clarity in the following discussion will be referred to interchangeably with the first application 320.

Likewise, the second application 322 can be one of many different types. One exemplary type of the second application 322 is a full-featured presentation application or player, which for the purpose of clarity in the following discussion will be referred to interchangeably with the second application 322.

The Web browser 320 includes a lightweight presentation component 324. The lightweight presentation component 324 includes a lightweight visual space 326. The lightweight visual space 326 is used to present media, an example of which is shown in FIG. 1. The lightweight visual space 326 comprises a portion of the screen 304. This portion is controlled by the lightweight presentation component 324 and is used by it to present graphical information to the user. This portion is a space, shown as a "window" or a portion of a "window" on the screen 304.

The full-featured presentation application 322 includes a renderer 328 and a full visual space 330. Examples of the full visual space 330 and a user interface of the full-featured presentation application 322 are shown in FIG. 2. The full visual space 330 comprises a portion of the screen 304. The full-featured presentation application 322 controls the full visual space 330 and uses it to present graphical information to the user. The space is typically a "window" or a portion of a "window."

FIG. 4 also shows process boundaries between these applications. The Web browser 320 resides and runs within a lightweight component's process and the full-featured presentation application 322 resides and runs within a renderer's process. The operating system does not run or reside within any process, but instead manages the processes. How these applications interact will be discussed in greater detail below.

The lightweight presentation component 324 presents media within the lightweight visual space 326. The rendering of the media for presentation within the lightweight visual space 326, however, is performed with the full-featured presentation application's 322 renderer 328. The lightweight visual space 326 represents that part of the visual space within a user interface (corresponding to the process in which the Web browser 320 resides) that the lightweight presentation component 324 is allotted for media presentation. The lightweight visual space 326 also presents that space in which the renderer 328 will render media for presentation by the lightweight presentation component 324.

The lightweight presentation component 324 can, as stated above, be contained within the Web browser 320. Examples of such include a basic media player, an ActiveX® control, a mini-mode player, and a media-player control for the dashboard in various Web browsers. The lightweight presentation component 324 can also be a stand-alone application, such as a small application designed to provide basic media-playing services. One of the advantages of the lightweight presentation component 324 over the larger full-featured presentation application 322 is that it can be more easily contained within an application providing other non-media playing services (like a Web browser). Another advantage of the lightweight presentation component 324 is that it can be small, allowing it to be more easily run from a remote location.

FIGS. 1, 2, and 6 show various ways in which media might be presented Is to a user using the principles described herein. The described system and method allows switching presentation of a media file between these presentation modes without interruption.

FIG. 1 shows examples of the screen 304 and the lightweight presentation component's visual space 326, as well as other features described below.

Here the screen 304 shows a desktop with the first application user interface 102 created by the first application 320 (the Web browser). The screen 304 also includes a taskbar 112 with a first application taskbar indicator 114 showing that the Web browser 320 is running and in focus.

The first application process user interface 102 includes the visual space 326 (shown in FIGS. 1 and 4) used by the lightweight presentation component 324 (shown in FIG. 4). The visual space 326 is that area in which the lightweight presentation component 324 presents media. In this example, the media presented is a moving figure of a woman singing a song (the media being entitled "Twain").

Thus, FIG. 1 shows an example of the operation of the Web browser 320 and its lightweight presentation component 324, each of which is interacting with the user through the screen 304.

FIG. 2 shows an example of the screen 304, the user interface of the full-featured presentation application 322 and its visual space 330, as well as other features described below.

Here the screen 304 shows a desktop with the full-featured user interface 202 created by the full-featured presentation application 322. The screen 304 also includes the taskbar 112 with the Web browser taskbar indicator 114 showing that the Web browser 320 is running but not in focus and a full-featured presentation application indicator 204 showing that the full-featured presentation application 322 is running and in focus.

In FIG. 2, the Web browser's 320 user interface 102 is partially obscured by the full-featured presentation application's 322 user interface 202. The Web browser user interface 102 is not in focus and is shown without a media file being presented in it. The full-featured presentation application user interface 202, however, is in focus and interacting with the user. The full-featured presentation application user interface 202 is allotted for use by the process in which the full-featured presentation application 322 (here, the Windows® Media Player 9 Series® shown as an example) runs.

The full-featured presentation application user interface 202 contains a visual space (the full visual space 330) in which the full-featured presentation application 322 presents media.

The full-featured presentation application 322 is shown presenting the same media file (though later in time) as shown in the lightweight visual space 326 of FIG. 1. In this example, the media presented is the same media file presented in FIG. 1, showing a moving figure of a woman singing a song (still entitled "Twain").

Thus, FIG. 2 shows an out-of-focus example of the Web browser's 320 user interface 102 without its lightweight presentation component 324 presenting media, and an in-focus example of the full-featured presentation application's 322 presentation of media in its user interface 202.

Figure 5:
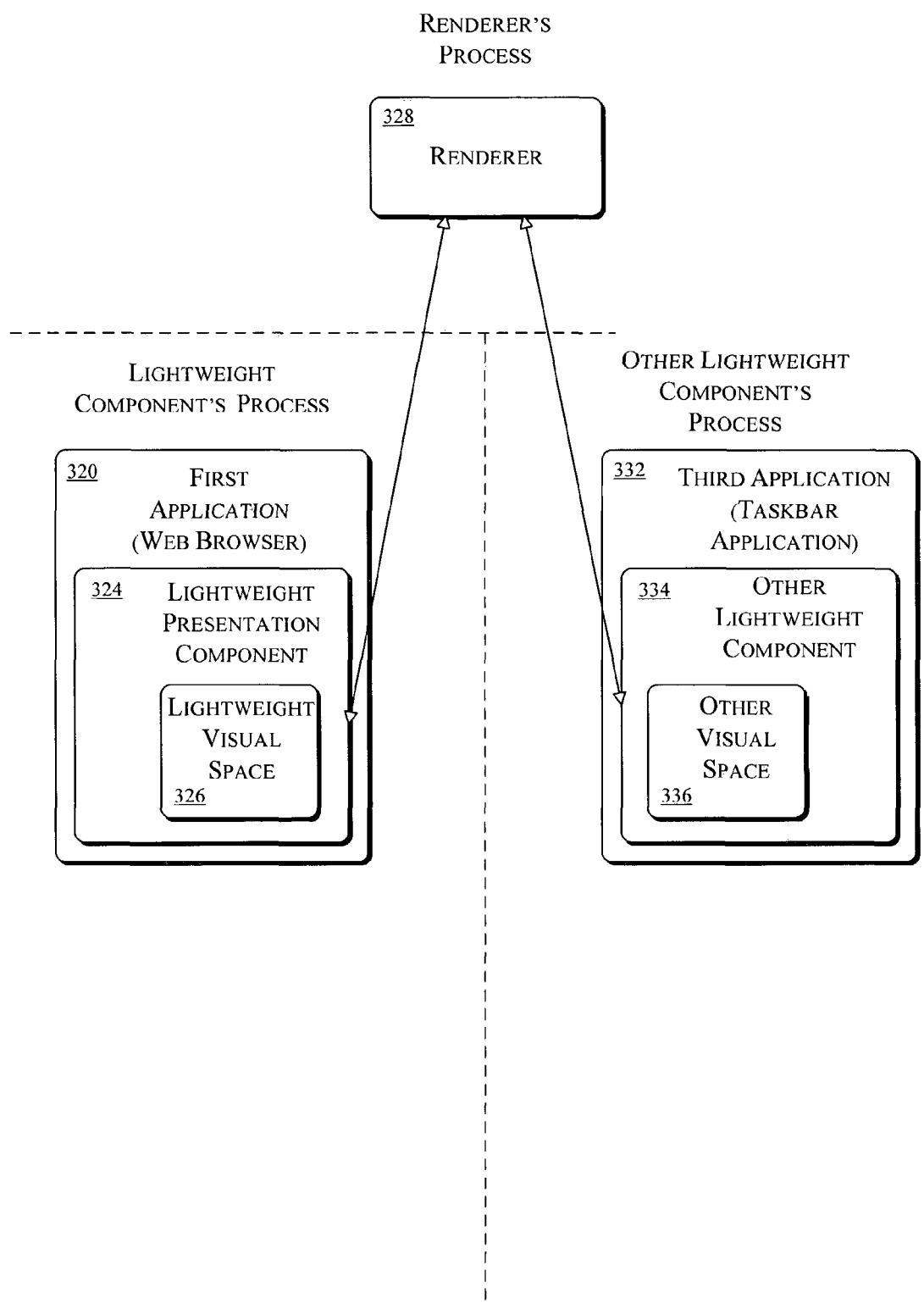
FIG. 5 illustrates an architecture showing a lightweight component's process, a renderer's process, and another lightweight component's process and applications running within them, which are within the memory of the computer system of FIG. 3.

FIG. 5 shows an example of applications that can be included within the memory 318 of FIG. 3, communication between these programs, and process boundaries (shown as dashed lines). In this example, the applications within the lightweight component's process are unchanged, but the renderer 328 is a stand-alone application in the renderer's process. Also, another lightweight component's process is included that includes a third application 332. The third application 332 can be one of many different types. One exemplary type of the third application 332 is a full-featured presentation application, much like the full-featured presentation application 322. Another exemplary type of the third application 332 is a stand-alone taskbar presentation application, which for the purpose of clarity in the following discussion will be referred to interchangeably with the third application 332.

The taskbar presentation application 332 contains another lightweight presentation component 334. The other lightweight presentation component 334 presents media within the other visual space 336. The presentation of the media within the other visual space 336, however, is performed with rendering provided by the renderer 328. The lightweight visual space 336 represents that part of the visual space within a user interface (corresponding to the process in which the taskbar presentation application 332 resides) that the other lightweight presentation component 334 is allotted for media presentation.

FIG. 5 shows an exemplary architecture allowing a user to switch presentation of a media file between applications in disparate processes. Here, the user can, for instance, switch from one application containing a lightweight presentation component to a stand-alone lightweight presentation component. If, for instance, the user is viewing media with a lightweight presentation component in the Web browser 320, but wants to close the Web browser while still viewing the media the user can do so. An example of a stand-alone lightweight presentation component being executed is shown in FIG. 6.

FIG. 6 shows an example of the screen 304 and the other lightweight presentation component's 334 visual space 336.

Here the taskbar application's 332 other lightweight component 334 presents media in the other visual space 336. This media can be the same media presented in FIGS. 1 and 2 by the Web browser 320 and the full-featured presentation application 322, but is shown presenting a different media file. The media presented is a visualization, or moving graphics, accompanying an audio file.

The above devices and applications are merely representative, and other known devices and programs may be substituted for or added to those shown in FIGS. 3, 4, and 5. One example of another known device that can be substituted for those shown in FIGS. 3, 4, and 5 is the device shown in FIG. 10.

Cross-Process Rendering to Two or More Processes

Overview

Using the renderer 328 running in the renderer's process (shown in FIGS. 4 and 5), the system 300 can present media through various applications, even if those applications run in different processes. The system 300 can also switch the media presentation between various applications and their processes without interruption.

The system 300 can, for example, present a media file in the lightweight component's process with the lightweight presentation component 324 and switch, without interruption of the media file;, to presenting it in the renderer's process with the full-featured presentation application 322 (in this case the renderer's process shown in FIG. 4). The media file presented in FIG. 1, for example, can be switched to being presented in FIG. 2 without interruption (though the applications shown in FIG. 1 and FIG. 2 do not show it performed without interruption). Thus, with the aid of the renderer 328, the lightweight presentation component 324 presents the media file in its visual space 326 and then, also with the aid of the renderer 328, the full-featured presentation application 322 presents the same media file in its full visual space 330.

In this example the user is able to switch from an application providing basic services to one providing basic and advanced services. The renderer 328 continues to render the media without interruption; in this case enabling the presentation to be moved from the lightweight presentation component's 324 visual space 326 to the larger full-featured presentation application's 322 full visual space 330 (shown in FIGS. 1 and 2). Nonetheless, the presentation (while expanded, physically moved, and now in a different process) is not interrupted.

The media rendered in the full-featured presentation application's 322 full visual space 330 is the same media file rendered in FIG. 1, though later in time. In actual usage, the disclosed method and system enable the image to continue without showing a perceptible delay or "hiccup." Thus, in actual usage the media shown in the full-featured presentation application's 322 full visual space 330 would be the same (or imperceptibly later) than the media shown in the prior visual space (here the lightweight presentation component's 324 visual space 326). This switching can also be done without skipping over or otherwise failing to present part of the media file.

Here the full-featured presentation application 322 provides basic and advanced services to the user, such as those services set forth in the user interface 202 (shown in FIG. 2). This user interface 202 provides the basic services of pausing, stopping, advancing, reversing, and changing the volume for the media file (also provided by the lightweight presentation component's 322 user interface 116). This full-featured presentation application's 322 user interface 202 also provides the advanced services of viewing a media guide, allowing media to be copied from a CD, viewing a media library, using a radio tuner, copying a file to a CD or other device, and other services. While the full-featured presentation application 322 provides advanced and basic services and presents in its visual space, it relies on the renderer 328 to perform the rendering.

Likewise, the system 300 can present a media file in the lightweight component's process with the lightweight presentation component 324 and switch, without interruption in the media file, to presenting it in the other lightweight component's process with the other lightweight presentation component 334 (shown in FIG. 5).

Further, the system 300 can present a media file in the renderer's process (of FIG. 4) with the full-featured presentation application 322 and switch, without interruption in the media file, to presenting it in the lightweight component's process with the lightweight presentation component 324.

Other combinations of switching presentation between applications and their processes can be performed by the system 300 with the aid of the renderer 328.

The examples described above show switching of presentation. These examples are not intended to be limiting. As described herein, the renderer 328 can be used to enable switching presentation from various applications and their processes, each without interrupting the presentation of the media.

Figure 7:
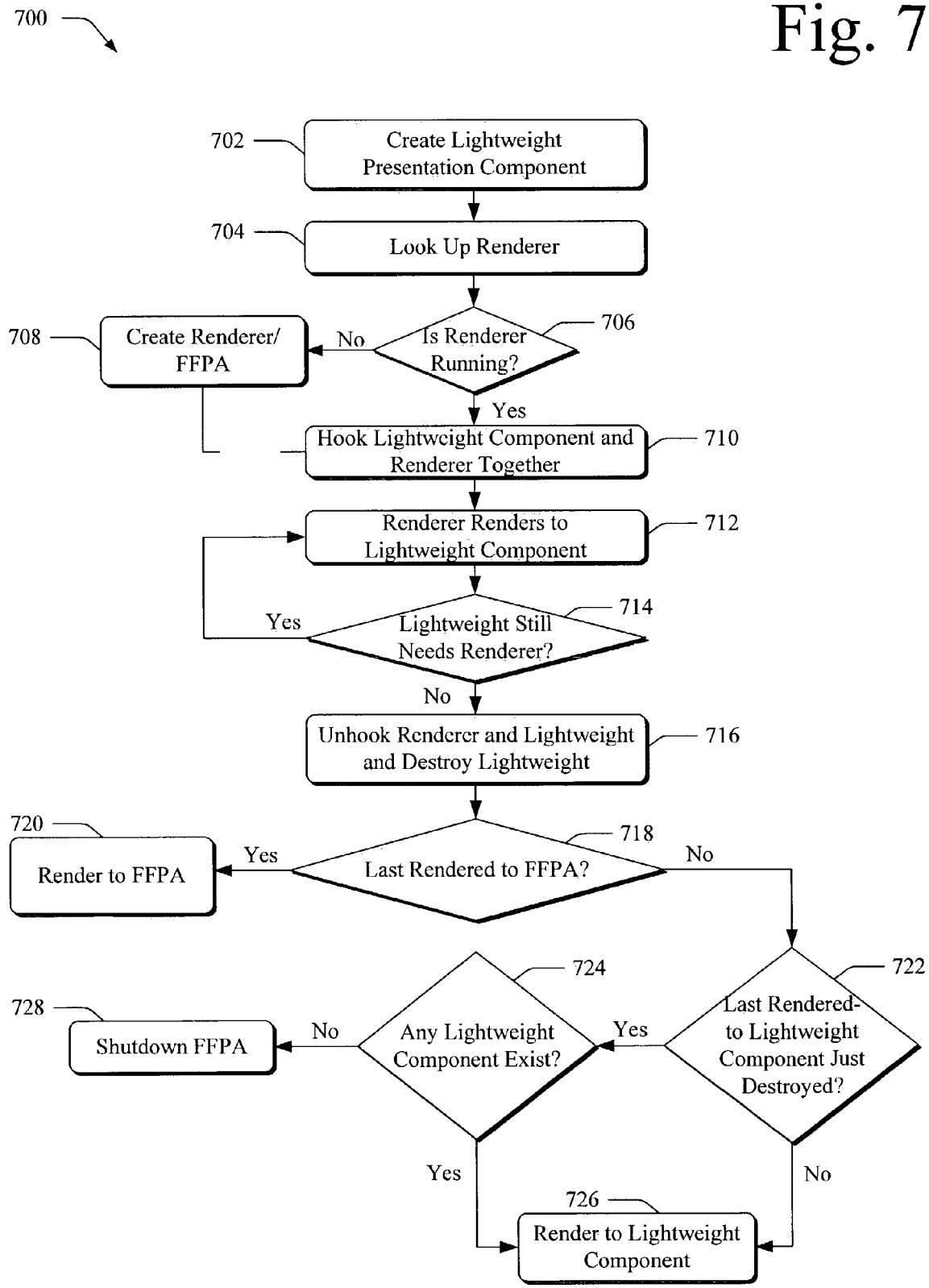
FIG. 7 is a flow diagram of an exemplary method for switching presentation of media from one process to another.

Presenting in a Lightweight Component's Process and Switching to a Renderer's or Another Lightweight Component's Process FIG. 7 shows a flow diagram 700 for rendering media in one process while allowing presentation of that media in other processes. This and the following flow diagrams are illustrated as series of blocks representing operations or acts performed by the system 300. These diagrams may be implemented in any suitable hardware, software, firmware, or combination thereof. In the case of software and firmware, they represent sets of operations implemented as computer-executable instructions stored in memory and executable by one or more processors.

Prior to or simultaneous with the first block of the diagram 700, the first application 320 is opened. This first application 320 can be one of many different applications as set forth above. In FIG. 1, for example, the first application 320 is a Web browser. Here the Web browser 320 runs in the lightweight component's process (see FIG. 4).

Then, or at the same time, the system 300 creates the lightweight presentation component 324 (block 702). The lightweight presentation component 324 can be an Active® component, as shown in the example of the lightweight presentation component 324 in FIG. 1. This lightweight presentation component 324 of FIG. 1 is part of the Web browser 320 and utilizes the lightweight visual space 326, which is part of the user interface 102 used by the lightweight component's process and the Web browser 320. As shown in this example, a user can browse the Internet while playing media—here the music video shown in FIG. 1 (though media is not yet being rendered at this stage in the diagram 700).

With the Web browser 320 and the lightweight presentation component 324 created, the system 300 looks up the renderer 328 (block 704). The system 300 can look up the renderer 328 through the lightweight presentation component 324 or the Web browser 320.

The lightweight presentation component 324 searches for the renderer 328 (or the full-featured presentation application ("FFPA") 322 in cases where the renderer 328 is part of the full-featured presentation application 322) to determine if it is running or not. The lightweight presentation component 324 can do so by searching for a window used by a process in which the renderer 328 resides (here the renderer's process of FIG. 4). It can also look for the renderer 328 by checking for a named event that the renderer 328 creates when it first begins to run. Also, it can find the full-featured presentation application 322 by locating the presence of some operating system registry key that the renderer 328 created when it was created.

At block 706, if the full-featured presentation application 322 and the renderer 328 are not running, the system 300 proceeds along the "No" path to block 708. If they are, it proceeds along the "Yes" path to block 710.

At block 708 the system 300 creates the full-featured presentation application 322 and the renderer 328.

At block 710, the system 300 hooks together the lightweight presentation component 324 and the renderer 328. Hooking together the lightweight presentation component 324 and the renderer 328 sets up communication between the two. Because the renderer 328 and the lightweight presentation component 324 are in different processes, to set up communication the lightweight presentation component 324 interacts with the operating system. The operating system is outside the lightweight component's and renderer's process and can communicate with each process.

One way in which communication can be set up is by the lightweight presentation component 324 communicating with a running object table of the operating system. In this implementation the lightweight presentation component 324 communicates with the running object table using normal APIs (Application Program Interfaces). Through this communication, the lightweight presentation component 324 is hooked to the renderer 328.

With the lightweight presentation component 324 communicating with the operating system and the running object table, the operating system can initialize communication with the full-featured presentation application 322 or can give information to the lightweight presentation component 324 for it to communicate directly with the full-featured presentation application 322 and the renderer 328. With this communication set up (shown in FIG. 4 as a line between the lightweight presentation component 324 and the renderer 328) they are "hooked".

In other implementations, they are hooked using windows messages, a component object model (COM), and remote procedure calls (RPCs).

With the lightweight presentation component 324 and the renderer 328 hooked together, the renderer 328 can now render video for the lightweight presentation component 324 to present in its lightweight visual space 326 (block 712). The lightweight presentation component 324 may or may not need rendering right away. When the lightweight presentation component 324 requests rendering of a media file for it to present in its visual space 326, the renderer 328 renders the media according to the lightweight presentation component's 324 specifications (such as size, placement in the visual space 326, and the like). One such example is the music video in the lightweight visual space 326 shown in FIG. 1.

So long as the lightweight presentation component 324 needs the renderer 328, the renderer 328 continues to serve the lightweight presentation component 324.

At block 714, if the lightweight presentation component 324 still needs the renderer 328 the system 300 proceeds along the "Yes" path to block 712. If the, lightweight presentation component 324 does not still need the renderer 328, the system 300 continues on the "No" path to block 716.

If the lightweight presentation component 324 no longer needs the renderer 328, such as because the user selected to switch the presentation of the media to another lightweight component's process or shut down the lightweight presentation component 324, the first application 320 unhooks the renderer 328 and the lightweight presentation component 324 and destroys the lightweight presentation component 324.

In FIG. 1, for example, a user interface 116 and the visual space 326 of the lightweight presentation component are shown. In FIG. 2, however, the lightweight presentation component 324 has been hidden, which is shown in FIG. 2 by there no longer being the lightweight presentation component's visual space 326 or its user interface 116.

In blocks 718, 720, 722, and 724 the system 300 attempts to determine whether or not the system 300 should switch the presentation of the current media file (or simply proceed to present a different file, if desired) to a different process. The system 300 determines whether to switch the presentation to the renderer's process or the other lightweight component's process based on various criteria, s discussed below.

In block 718, if the last presentation prior to the presentation in the lightweight presentation component's visual space 326 was in the full-featured presentation application's visual space 330, the renderer 328 switches the rendering to the full-featured presentation application 322, which then presents the media back in the full visual space 330 (block 720). If not, it proceeds along the "No" path to block 722.

At block 720 the renderer 328 switches rendering from the lightweight presentation component 324 (and thus the visual space 326) to the full-featured presentation application 322 (and thus its full visual space 330) without interruption. The switching shown from FIG. 1 to FIG. 2 is such an example. The renderer 328 renders the media file for presentation in the lightweight visual space 326 at block 712 and for the full visual space 330 at block 720. Because the renderer 328 running in block 712 also runs in block 720, the presentation is switched but the rendering is consistently performed by the same application (the renderer 328). Because of this, the presentation of the media file is not interrupted. This lack of interruption includes that there is no perceptible space in time that the media file is not being presented. Thus, the media file is presented without interruption somewhere on the screen 304 if the media file includes visual media and/or without a break in audio presentation if the media file includes audio media. This lack of interruption can also include that there is no perceptible loss of media being presented from the media file.

The renderer 328 can also render a different file for presentation in the full visual space 330, or wait for a request from the full-featured presentation application 322 to render a new or the same media file.

If the last presentation of the media file was not in the full visual space 330, the system 300 determines whether or not the last rendered-to lightweight component was just destroyed (block 722).

If the last rendered-to lightweight component was destroyed, the system 300 proceeds along the "Yes" path to block 724. If no, it proceeds along the "No" path to block 726.

At block 724, the system 300 determines if there are any remote lightweight presentation components remaining. The system 300 determines whether any remote lightweight presentation components exist (at block 722 and 724) by determining if any other applications have been hooked to the renderer 328.

Other lightweight presentation components and other applications that are capable of presenting media with the aid of the renderer 328 can be within various processes, (e.g., the other lightweight component's process) (each of which a "remote application" when running in a process other than the process in which the renderer 328 runs). In the example set forth in FIG. 6, the other lightweight presentation component 334 is another application found in block 722 that resides within the other lightweight component's process shown in FIG. 5.

At block 724, if the system 300 determines that any lightweight component still exists, the system 300 proceeds to render to this other lightweight component (block 726). If not, the system 300 shuts down the full-featured presentation application 322 (and thus also the renderer 328) (block 728).

At block 726, the system 300 (through the renderer 328) renders to a lightweight component (or remote application) found in block 722 or 724. If there is more than one remote application (such as if the system 300 found two remote lightweight components at block 724), the system 300 decides to which application to render media, based on factors discussed below.

The system 300 can continue rendering the same media file or another media file. FIG. 6 shows an example of the system 300 finding another application (the other lightweight presentation component 334) at block 724. In this example the renderer 328 renders (block 726) a different media file than the one rendered in block 712 (shown in FIG. 1), which the other lightweight presentation component 334 presents in its lightweight visual space 336.

Switching to and Presenting in a Renderer's Process

Figure 8:
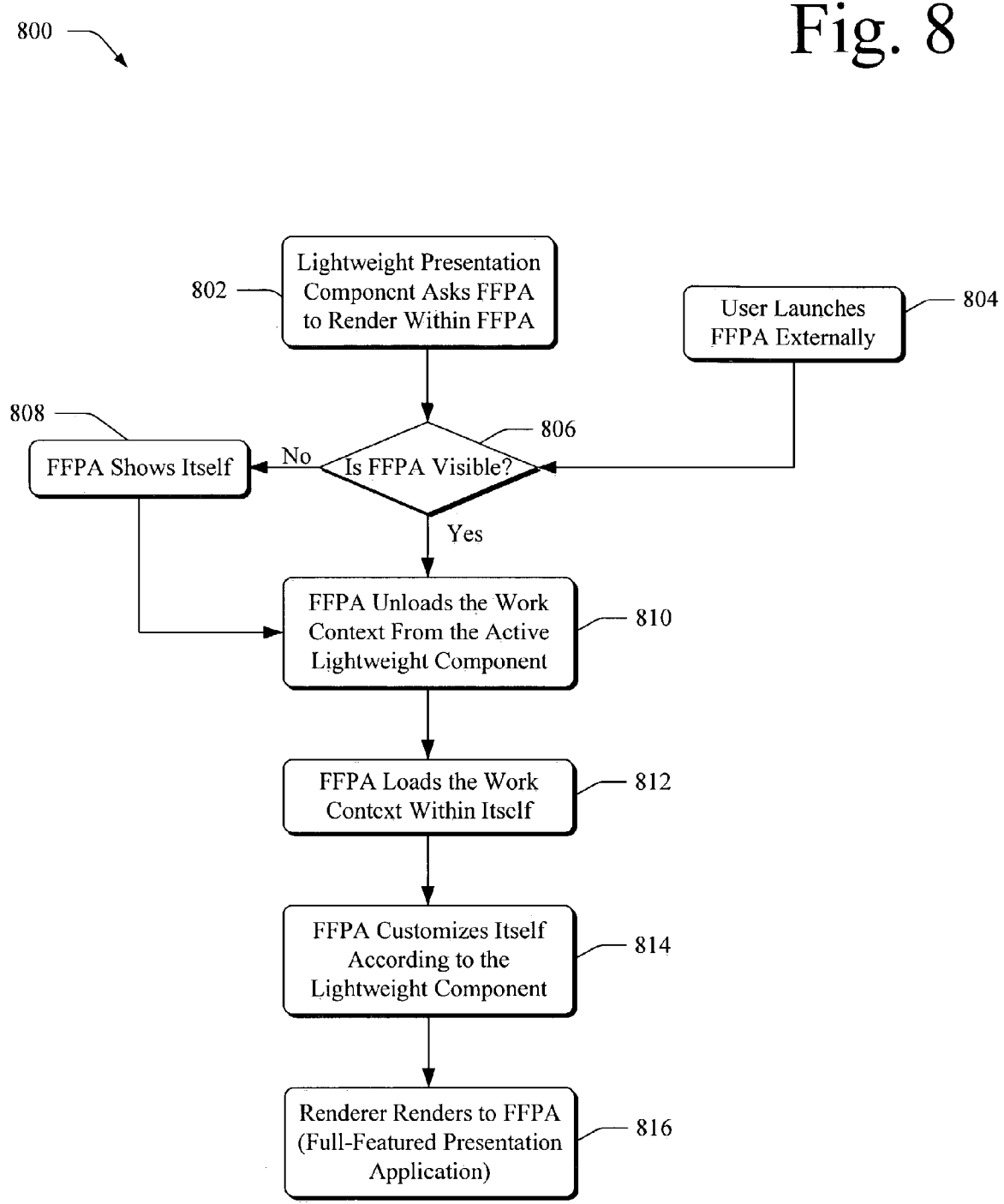
FIG. 8 is a flow diagram of an exemplary method for switching presentation from a lightweight component's process to a process containing a full-featured presentation application.

FIG. 8 shows a flow diagram 800 for switching presentation to a renderer's process. The diagram 800 also sets forth an implementation of a method for switching presentation to a renderer's process having advanced services (such as shown in FIG. 4). In this diagram 800, the renderer 328 renders media for presentation by the full-featured presentation application 322. Because the full-featured presentation application 322 provides advanced services, if the media file was previously being presented with only basic services, the diagram 800 sets forth a method by which an advanced user interface and advanced services can be added to a presentation of a media file.

Prior to block 802 or 804 of this diagram 800, we assume that a media file is being presented in a remote process. This remote process can be the, lightweight component's process, shown in FIG. 4, or another remote process.

The remote process also can be the other lightweight component's process in which the third application 332 (the taskbar application 332) runs, shown in FIG. 5. In this case, however, an application capable of offering advanced services would also be present, either as part of the renderer's process or another process (not shown).

From the remote process, a user can switch the presentation to the full-featured presentation application 322. Often a user viewing media with basic services (such as shown in FIG. 1) that runs in one process (such as the lightweight component's process of FIG. 4), wants to view the media with advanced services (such as shown in FIG. 2). In such a case, the system 300 allows the user to switch the presentation of the media file from the lightweight component's process to a process that includes the full-featured presentation application 322 (shown in FIG. 4). By so doing, the user can enjoy advanced services provided by the full-featured presentation application 322.

At block 802 or 804, the system 300 determines that the user wishes to switch the media to advanced services. At block 802, a lightweight component (such as the lightweight presentation component 324 of the lightweight component's process) asks the full-featured presentation application 322 to present the currently presented media file rather than the lightweight component. The lightweight component can do so for various reasons, including the user having selected a button or some other indicator within the lightweight component's user interface showing a desire to present the media with advanced services. In FIG. 1, for example, the lightweight presentation component 324 contains an advanced services button 118. If the user selects this button, the lightweight presentation component 324 (with the system 300) will attempt to switch the presentation of the media file to the full-featured presentation application 322 to gain advanced services.

The user can also indicate his or her desire to have the file presented with advanced services by launching the full-featured presentation application 322 externally. Thus, at block 804, the user could simply attempt to launch the full-featured presentation application 322, thereby indicating a desire to switch the media to the full-featured presentation application 322 for advanced services.

The full-featured presentation application 322 may already be running (though this may not be apparent to the user). In the example set forth in FIG. 1, the full-featured presentation application 322 is running, even though there is no indication of such in the taskbar 112. In this example the renderer 328 runs within the full-featured presentation application 322 in the renderer's process (see FIG. 4). Thus, in this example the full-featured presentation application 322 is already launched and is running because the renderer 328 is part of the full-featured presentation application 322 (and the renderer 328 is rendering media for the lightweight presentation component 324 in the lightweight component's process). In this example the full-featured presentation application's 322 advanced user interface 206 and the full visual space 330 are not visible. At block 806, then, if the full-featured presentation application 322 is not visible, the system 300 proceeds along the "No" path to block 808.

At block 808 the full-featured presentation application 322 shows itself. It can do so by showing the advanced user interface 206 and the full visual space 330. As part of this showing, the full-featured presentation application 322 can also indicate that it is running with the full-featured presentation application taskbar indicator 204 shown in FIG. 2.

The full-featured presentation application 322 may be visible, however. In cases where it is visible, the system 300 has no need to require the full-featured presentation application 322 to show itself (such as by showing the full visual space 330 or the advanced user interface 202). At block 806, then, if the full-featured presentation application 322 is visible, the system 300 proceeds along the "Yes" path to block 810.

In either case, the full-featured presentation application 322 unloads a work context from the lightweight presentation component currently presenting the media file (block 810). The full-featured presentation application 322 can do so through the communication previously set up by hooking the renderer 328 to the lightweight presentation component currently presenting the media (see FIG. 7). In the ongoing example, the full-featured presentation application 322 unloads the work context from the lightweight presentation component 324 of the lightweight component's process.

The work context includes information regarding where on the screen 304 the media is being presented, as well as customization aspects. This work context can be useful in making the switching as seamless and non-disruptive to the user as possible. Through switching of work context, the user can experience a similar or customized user interface, keep his or her preferences (like volume level, brightness, and the like), or even retain specialized aspects of a user interface, like colors in the user interface, size of the service icons, and the like.

Thus, the work context is useful in making those preferences of the user from the prior presentation (such as from the lightweight presentation component 324 of FIG. 1o) also represented in the new presentation within the full-featured presentation application 322. At block 812, the full-featured presentation application 322 loads the work context within itself.

Based on the lightweight presentation component in which the media file was previously (and/or currently) presented, the full-featured presentation application 322 customized itself (block 814). The full-featured presentation application 322 does so to make the transition from the previous application to the full-featured presentation application 322 as visually seamless as possible.

Once the full-featured presentation application 322 customizes itself and loads in the prior work context, the full-featured presentation application 322 presents the media file in the full visual space 330 (block 816). The full-featured presentation application 322 can start presenting the media file after the prior presentation in the lightweight presentation component 324 ceases, but within an imperceptible amount of time to the user. The full-featured presentation application 322 receives the rendering of the media file from the renderer 328 simultaneous with, shortly before, or shortly (imperceptibly) after the renderer 328 ceases rendering to the lightweight presentation component 324. The switch can also be done without loss or interruption of any of the media file.

In the ongoing example, the media is continued without interruption in the media playback, as approximated in FIGS. 1 and 2.

The media file can be continued without interruption or a hiccup in part because the renderer 328 does the rendering for presentation in the prior visual spaces (such as the lightweight visual space 326 in the lightweight component's process) and the full visual space 330. This continuity allows switching of presentation from one application to another application and from one process to another process without interruption.

Figure 9:
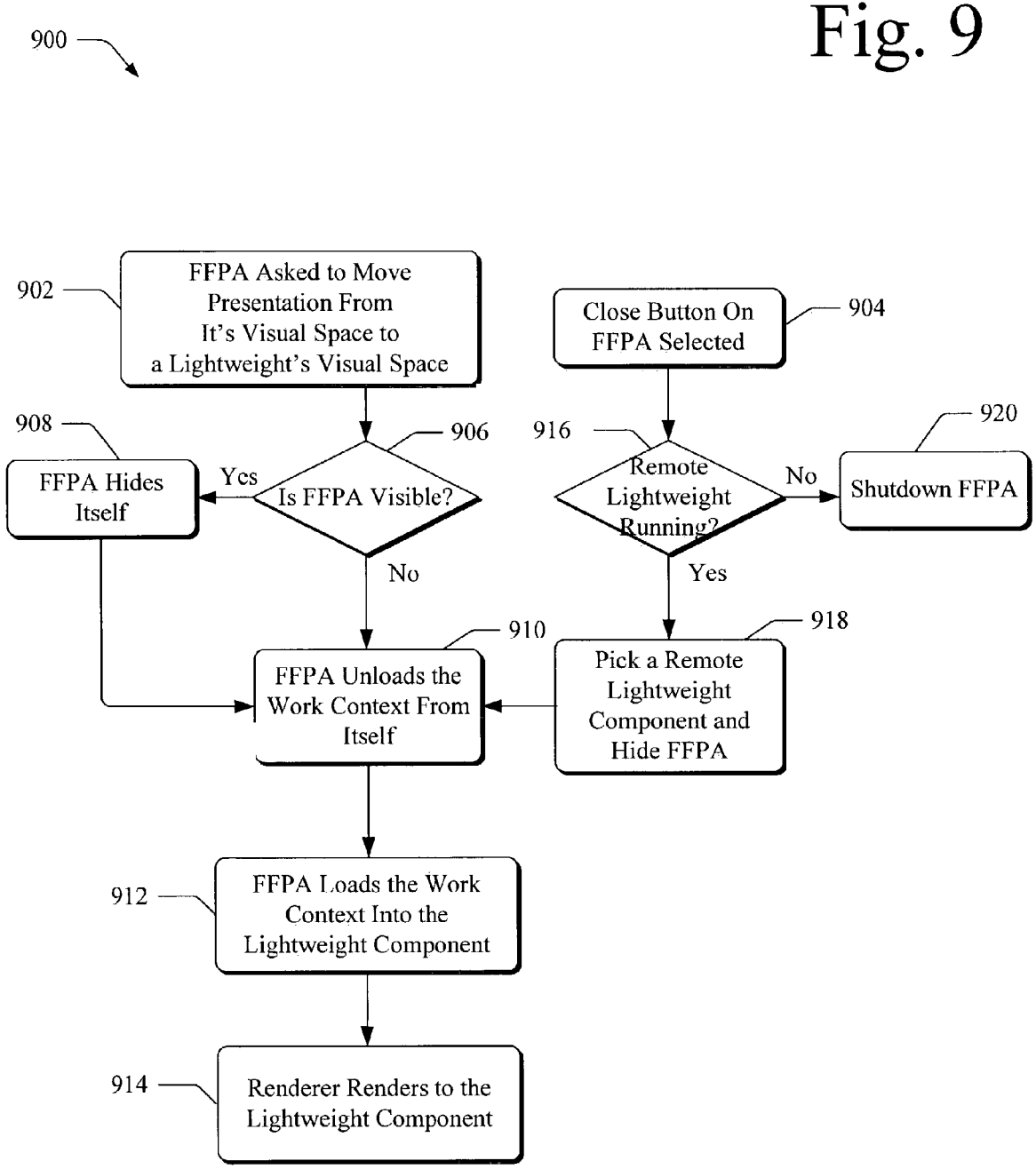
FIG. 9 is a flow diagram of an exemplary method for switching presentation from a process containing a full-featured presentation application to a lightweight component's process or another lightweight component's process.

Switching Presentation from a Renderer's Process to Another Lightweight Component's Process FIG. 9 shows a flow diagram 900 for switching presentation from a renderer's process to another lightweight component's process. The diagram 900 also sets forth an implementation of a method for switching presentation from a process with advanced services to a process with basic services.

Prior to block 902 or 904 of this diagram 900, we assume that a media file is being presented in the full-featured presentation application's 322 process (the renderer's process of FIG. 4). From this process, a user can switch the presentation to a different process, such as one having the lightweight presentation component 324 or the other lightweight presentation component 334. Often a user viewing media with advanced services in one process, such as the renderer's process containing the full-featured presentation application 322 shown in FIG. 2, wants to view the media with basic services. In such a case, the system 300 allows the user to switch the presentation of the media file from a process containing the full-featured presentation application 322 to a different process.

At block 902, the full-featured presentation application 322 receives instructions to switch the presentation from its visual space 330 to a different visual space. These instructions can be directly from a user or inferred by the user's actions.

If the full-featured presentation application 322 is currently visible, the system 300 proceeds along the "Yes" path to block 908. If not, it proceeds along the "No" path to block 910.

At block 908, the full-featured presentation application 322 hides itself. Thus, the full-featured presentation application's 322 visual space 330 and advanced user interface 202 are deleted from the screen 304. The full-featured presentation application 322 does so to remove clutter from the screen 304 and to not disturb the process in which the lightweight presentation component runs or viewing the future presentation in the lightweight presentation component's visual space. The full-featured presentation application 322 can also remove the full-featured presentation application taskbar indicator 204 from the taskbar 112, though it can remain installed, depending on whether the renderer 328 is part of the full-featured presentation application 322. Examples of this hiding are seen in FIG. 6, where no indication of the full-featured presentation application 322 existing is shown.

At blocks 910 and 912, the full-featured presentation application 322 switches the work context from the full-featured presentation application 322 to the lightweight presentation component chosen to continue presenting the media file currently presented in the full-featured presentation application's 322 visual space 330.

First, the full-featured presentation application 322 unloads the work context from itself, block 910. This work context can be useful in making the switching as seamless and non-disruptive to the user as possible. Through switching of work context, the user can experience a similar or customized user interface, keep his or her preferences (like volume level, brightness, and the like), or even retain specialized aspects of a user interface, like colors in the user interface, size of the service icons, and the like.

In block 912, the full-featured presentation application 322 loads the work context into the lightweight presentation component that was chosen to present the media file.

FIGS. 1 and 2 show an example of what the full-featured presentation application 322 switching presentation and work context from the full-featured presentation application's 322 visual space 330 (FIG. 2) to the lightweight presentation component's 324 lightweight visual space 326 (FIG. 1) can look like. This FIG. 1 shows the media being presented at an earlier point in the media file, but approximates how the switching back can look. In this example, the full-featured presentation application 322 was presenting the media file in its visual space 330, shown in FIG. 2, and then the system 300 switches the presentation to the lightweight presentation component 324 (in part by having the renderer 328 render to the lightweight presentation component 324). Then, the full-featured presentation application 322 hides itself.

Thus, in block 914, the renderer 328 renders media to the chosen lightweight presentation component, which the lightweight presentation component then presents in its visual space (such as the lightweight visual space 326 of FIG. 1 or the other lightweight visual space 336 of FIG. 6). The media presented can be an uninterrupted continuation of the media file previously presented in the full-featured presentation application's 322 visual space 330, or can be another media file.

Along the blocks 904, 916, and 918, the renderer 328 can render the same or another media file, which will be discussed below.

Returning to block 904, a user can request that the full-featured presentation application 322 be closed (and thus cease the advanced services). The full-featured presentation application 322 can close or hide itself, based on factors discussed below.

At block 916, the system 300 determines if there are any remote lightweight presentation components running, such as the lightweight presentation component 324 or the other lightweight presentation component 334. This is because the user, by closing the full-featured presentation application 322, may wish that the current media file be presented by another application, such as the Web browser 320 (which contains the lightweight presentation component 324). Also by closing the full-featured presentation application 322, the user may want another media file previously presented in another lightweight component to now be presented.

If there are no other lightweight presentation components running, the system 300 proceeds along the "No" path, shutting down the full-featured presentation application 322 (block 920).

If there is another live lightweight presentation component, the system 300 proceeds along the "Yes" path to block 918. Here, a remote lightweight presentation component is one residing in a process other than the process in which the full-featured presentation application 322 resides.

In block 918, the system 300 picks a remote lightweight presentation component to which to render media, though this media can be a continuation of the currently rendered media file or another media file. As part of this block, the full-featured presentation application 322 hides itself (similar to block 908).

If there is more than one remote lightweight presentation component running, the system 300 determines to which to switch the rendering of the media file (or start rendering another media file). In one implementation, the system 300 picks the lightweight presentation component to which the renderer 328 has most recently rendered media.

Once the system 300 has picked a lightweight presentation component to which to render, it proceeds to blocks 910, 912, and 914, as set forth above.

A Computer System

FIG. 10 shows an exemplary computer system that can be used to implement the processes described herein. Computer 1042 includes one or more processors or processing units 1044, a system memory 1046, and a bus 1048 that couples various system components including the system memory 1046 to processors 1044. The bus 1048 represents one or more of any of several types of bus structures, including a memory bus or memory controller, a peripheral bus, an accelerated graphics port, and a processor or local bus using any of a variety of bus systems. The system memory 1046 includes read only memory (ROM) 1050 and random access memory (RAM) 1052. A basic input/output system (BIOS) 1054, containing the basic routines that help to transfer information between elements within computer 1042, such as during start-up, is stored in ROM 1050.

Computer 1042 further includes a hard disk drive 1056 for reading from and writing to a hard disk (not shown), a magnetic disk drive 1058 for reading from and writing to a removable magnetic disk 1060, and an optical disk drive 1062 for reading from or writing to a removable optical disk 1064 such as a CD ROM or other optical media. The hard disk drive 1056, magnetic disk drive 1058, and optical disk drive 1062 are connected to the bus 1048 by an SCSI interface 1066 or some other appropriate interface. The drives and their associated computer-readable media provide nonvolatile storage of computer-readable instructions, data structures, program modules and other data for computer 1042. Although the exemplary environment described herein employs a hard disk, a removable magnetic disk 1060 and a removable optical disk 1064, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1056, magnetic disk 1060, optical disk 1064, ROM 1050, or RAM 1052, including an operating system 1070, one or more application programs 1072 (such as the full-featured presentation application 322 or the renderer 328), other program modules 1074, and program data 1076. A user may enter commands and information into computer 1042 through input devices such as a keyboard 1078 and a pointing device 1080. Other input devices (not shown) may include a microphone, joystick, game pad, satellite dish, scanner, or the like. These and other input devices are connected to the processing unit 1044 through an interface 1082 that is coupled to the bus 1048. A monitor 1084 or other type of display device is also connected to the bus 1048 via an interface, such as a video adapter 1086. In addition to the monitor, personal computers typically include other peripheral output devices (not shown) such as speakers and printers.

Computer 1042 commonly operates in a networked environment using logical connections to one or more remote computers, such as a remote computer 1088. The remote computer 1088 may be another personal computer, a server, a router, a network PC, a peer device or other common network node, and typically includes many or all of the elements described above relative to computer 1042. The logical connections depicted in FIG. 10 include a local area network (LAN) 1090 and a wide area network (WAN) 1092. Such networking environments are commonplace in offices, enterprise-wide computer networks, intranets, and the Internet.

When used in a LAN networking environment, computer 1042 is connected to the local network through a network interface or adapter 1094. When used in a WAN networking environment, computer 1042 typically includes a modem 1096 or other means for establishing communications over the wide area network 1092, such as the Internet. The modem 1096, which may be internal or external, is connected to the bus 1048 via a serial port interface 1068. In a networked environment, program modules depicted relative to the personal computer 1042, or portions thereof, may be stored in the remote memory storage device. It will be appreciated that the network connections shown are exemplary and other means of establishing a communications link between the computers may be used.

Generally, the data processors of computer 1042 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method switches presentation of a media file from within one process to within another process without interruption in the presentation of that media file. Although the invention has been, described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   presenting a media file within a first user interface of a first application;
   unloading a work context from the first application that describes a position for the presenting of the media file on a display and one or more user defined aspects to customize the presenting of the media in the first application;
   loading the work context from the first application into a second application to transfer the position and the one or more user defined aspects; and
   switching the presenting of the media file from the first user interface to a second user interface within the second application, the first user interface and the second user interface being provided within different respective software components that are independent of one another,
   wherein the switching is performed without interruption in the presenting of the media file using a common renderer configured as a software component that is hooked to each said application via an application programming interface (API) that interacts with a running object table to enable the common renderer to communicate the work context and media file between both said applications, and to continuously render the media file while switching sending of the rendered media file between said first application and said second application, such that the common renderer performs rendering of the media file for presentation in either said application.

2. The method of claim 1, wherein the first user interface is controlled by one of said software components that is configured as a lightweight presentation component.

3. The method of claim 1, wherein the second user interface is controlled by one of said software components that is configured as a lightweight presentation component within the second process.

4. The method of claim 1, wherein the first user interface is controlled by one of said software components that is configured as a first lightweight presentation component and the second user interface is controlled by another of said software components that is configured as a second lightweight presentation component within the second process.

5. The method of claim 1, wherein the presenting is performed with aid from the common renderer and, wherein the common renderer executes in the second application.

6. The method of claim 1, wherein the presenting is performed with aid from the common renderer and, wherein the common renderer executes in a third application.

7. The method of claim 1 wherein the user defined aspects include one or more of screen position, user display preferences, user interface attributes, or volume settings.

8. The method of claim 1, wherein the first application includes controls for selecting basic media presentation services.

9. The method of claim 1, wherein the second application includes controls for selecting advanced media presentation services.

10. A computer-readable storage medium comprising computer-executable instructions that perform the following when executed by a computer:
presenting media within a first application;
unloading a work context from the first application that describes one or more user defined aspects to customize the presenting of the media in the first process, the user defined aspects including screen position and one or more of user display preferences, user interface attributes, or volume settings;
loading the work context from the first application into a second application to transfer the one or more user defined aspects; and
switching the presenting to the second application without interruption in the presenting of the media using a common renderer configured as a software component to continuously render the media while switching sending of the rendered media between said first application and said application, such that the common renderer performs rendering of the media for presentation in either application, wherein:
the first application and the second application correspond to different respective software components that are independent of one another; and
the common renderer is hooked to each said application via an application programming interface (API) that interacts with a running object table of an operating system to enable the common renderer to provide the media and work context when rendered to either said application.

11. The computer-readable storage medium of claim 10, further comprising:
switching the presenting from the second application to the first application without interruption in the presenting of the media.

12. The computer-readable storage medium of claim 10, further comprising:
switching the presenting from the second application to a third application without interruption in the presenting of the media.

13. The computer-readable storage medium of claim 10, wherein the presenting within the first application is presented in a visual space of one of said software components that is configured as a lightweight presentation component in the first application.

14. The computer-readable storage medium of claim 10, wherein the presenting within the first application is presented in a visual space of one of said software components that is configured as a lightweight presentation component in the first application and the lightweight presentation component provides controls for basic media-playing services.

15. The computer-readable storage medium of claim 10, wherein the presenting within the first application is presented in a visual space of one of said software components that is configured as a lightweight presentation component in the first application, the lightweight presentation component provides controls for basic media-playing services, and the lightweight presentation component is contained within the first application.

16. The computer-readable storage medium of claim 10, wherein the presenting within the first application is performed with aid of the common renderer and, wherein the common renderer executes in a third application.

17. The computer-readable storage medium of claim 10, wherein the presenting within the first application is performed with aid of the common renderer in the second application.

18. The computer-readable storage medium of claim 10, wherein the presenting in the second application is performed through one of said software components that is configured as a full-featured presentation application.

19. The computer-readable storage medium of claim 10, wherein the presenting in the second application is performed through one of said software components that is configured as a full-featured presentation application and further comprising providing advanced media-playing services and controls for their selection through the full-featured presentation application.

20. The computer-readable storage medium of claim 10, wherein the presenting in the second application is performed with aid of the common renderer and, wherein the common renderer is part of one of said software components that is configured as a full-featured presentation application.

21. The computer-readable storage medium of claim 10, wherein the presenting in the second application is performed with aid of the common renderer and, wherein the common renderer executes in a third application.

22. The computer-readable storage medium of claim 10, wherein the presenting in the second application is performed with aid of the common renderer and, wherein the common renderer executes in the second application.

23. The computer-readable storage medium of claim 10, wherein the presenting in the first application and the second application is performed with aid of the common renderer and, wherein the common renderer executes in the second application.

24. The computer-readable storage medium of claim 10, wherein the presenting in the first application and the second application is performed with aid of the common renderer and, wherein the common renderer executes in a third application.

25. An apparatus comprising:
a processor;
means for presenting media within a first application;
means for unloading a work context from the first application that describes a position for the presenting of the media file on a display and one or more user defined aspects to customize the presenting of the media in the first application;
means for loading the work context from the first application into a second application to transfer the position and the one or more user defined aspects; and
means for switching the presenting to within the second application without interruption with aid of a common renderer configured as a software component to continuously render the media while switching sending of the rendered media between said first application and said second application, such that the common renderer performs rendering of the media for presentation in either said application;
wherein the first application and the second application correspond to different respective software components that are independent of one another; and the common renderer is hooked to each said application via an application programming interface (API) that interacts with a running object table of an operating system to enable the common renderer to provide the media and work context when rendered to either said application.

26. The apparatus of claim 25, further comprising:
means for switching the presenting from the second application to a third application without interruption.

27. The apparatus of claim 25, further comprising:
means for switching the presenting from the second application back to the first application without interruption.

28. A method comprising:
presenting a media file within a browser application in a first process;
unloading a work context from the first process that describes a position for the presenting of the media file on a display and one or more user defined aspects to customize the presenting of the media file in the first process;
loading the work context from the first process into a second process to transfer the position and the one or more user defined aspects; and
switching the presenting of the media file from the browser application to a full-featured presentation application in the second process without interruption in the presenting of the media file using a common renderer implemented as a software component that is hooked to each said application via an application programming interface (API) that interacts with a running object table to enable the common renderer to communicate the work context and media file between both said applications to perform rendering of the media file for presentation in either said application, wherein:
the full-featured presentation application is independent of the browser application;
the full-featured presentation application provides a set functionality to interact with the media file; and
the browser application provides a subset of the set of functionality that is provided by the full-featured presentation application to interact with the media file.

29. The method as recited in claim 28, further comprising:
switching the presenting from the full-featured presentation application to the browser application without interruption in the presenting of the media.

30. The method as recited in claim 29, further comprising:
switching the presenting from the browser application to another application in a third process without interruption in the presenting of the media.

31. The method as recited in claim 28, further comprising:
switching the presenting from the full-featured presentation application to another application in a third process without interruption in the presenting of the media.

32. The method as recited in claim 28, wherein the common renderer continuously renders the media file while switching sending of the rendered media file between the browser and the full-featured presentation application.

33. The method as recited in claim 28, wherein the common renderer is executed in the second process.

34. The method as recited in claim 28, wherein the common renderer is provided as part of the full-featured presentation application and executed in the second process.

35. The method as recited in claim 28, wherein the common renderer is executed in a third process.

36. The method as recited in claim 28, wherein the common renderer is a stand-alone application apart from the browser application and the full-featured presentation application.

37. The method as recited in claim 28, wherein the presenting within the browser application is presented in a visual space of a lightweight presentation component of the browser application.

38. The method as recited in claim 37, wherein the lightweight presentation component of the browser application includes controls for selecting basic media presentation services.

39. The method of claim 28, wherein the full-featured presentation application provides advanced media-playing services and includes controls for selection of the advanced media-playing services.

* * * * *